United States Patent [19]
Kesselring

[11] 3,888,369
[45] June 10, 1975

[54] VEHICLE TOW RIG

[76] Inventor: Banks E. Kesselring, R.D. 1, St. Thomas, Pa. 17252

[22] Filed: Sept. 16, 1974

[21] Appl. No.: 506,540

[52] U.S. Cl. .............................................. 214/86 A
[51] Int. Cl. .............................................. B60p 3/12
[58] Field of Search ................... 214/86 A; 280/402

[56] References Cited
UNITED STATES PATENTS

| | | | |
|---|---|---|---|
| 2,449,146 | 9/1948 | Ryan | 214/86 A |
| 2,481,223 | 9/1949 | Johnson | 214/86 A |
| 2,796,435 | 6/1957 | Ortiz et al. | 214/86 A X |
| 3,715,042 | 2/1973 | Rellinger | 214/86 A |

*Primary Examiner*—Leo Friaglia
*Attorney, Agent, or Firm*—John Howard Joynt

[57] ABSTRACT

Tow rig for vehicles, particularly for heavy-duty tractors, comprising an A-frame to be mounted in a substantially vertical plane, with lower leg connecting with the "fifth wheel" of a retrieving tractor. The two legs of the A-frame are pivotally secured together at the apex. Means are provided for tieing the A-frame to the tractor frame. A cable with winch control serves to quickly bring a bumper member in position for attachment to a vehicle to be towed. Power means are conveniently mounted on the rig and, acting on the upper leg of the A-frame, raises and lowers the front end of the vehicle to be towed. With relaxation of power the leg rests on pin and cross bar of the A-frame. There additionally is provided means secured between A-frame and bumper member to accommodate the rig to the particular size of the vehicle to be towed.

9 Claims, 8 Drawing Figures

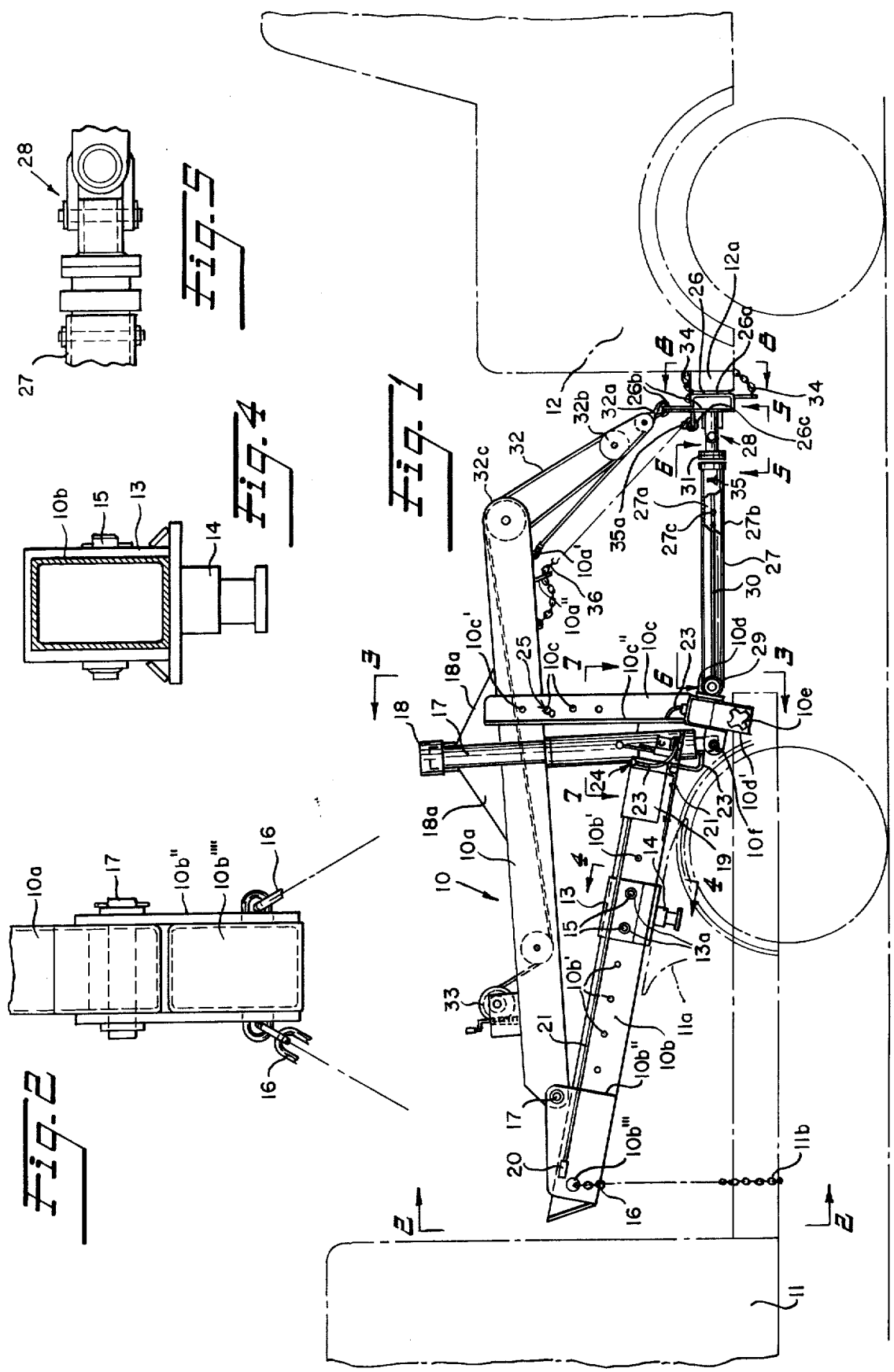

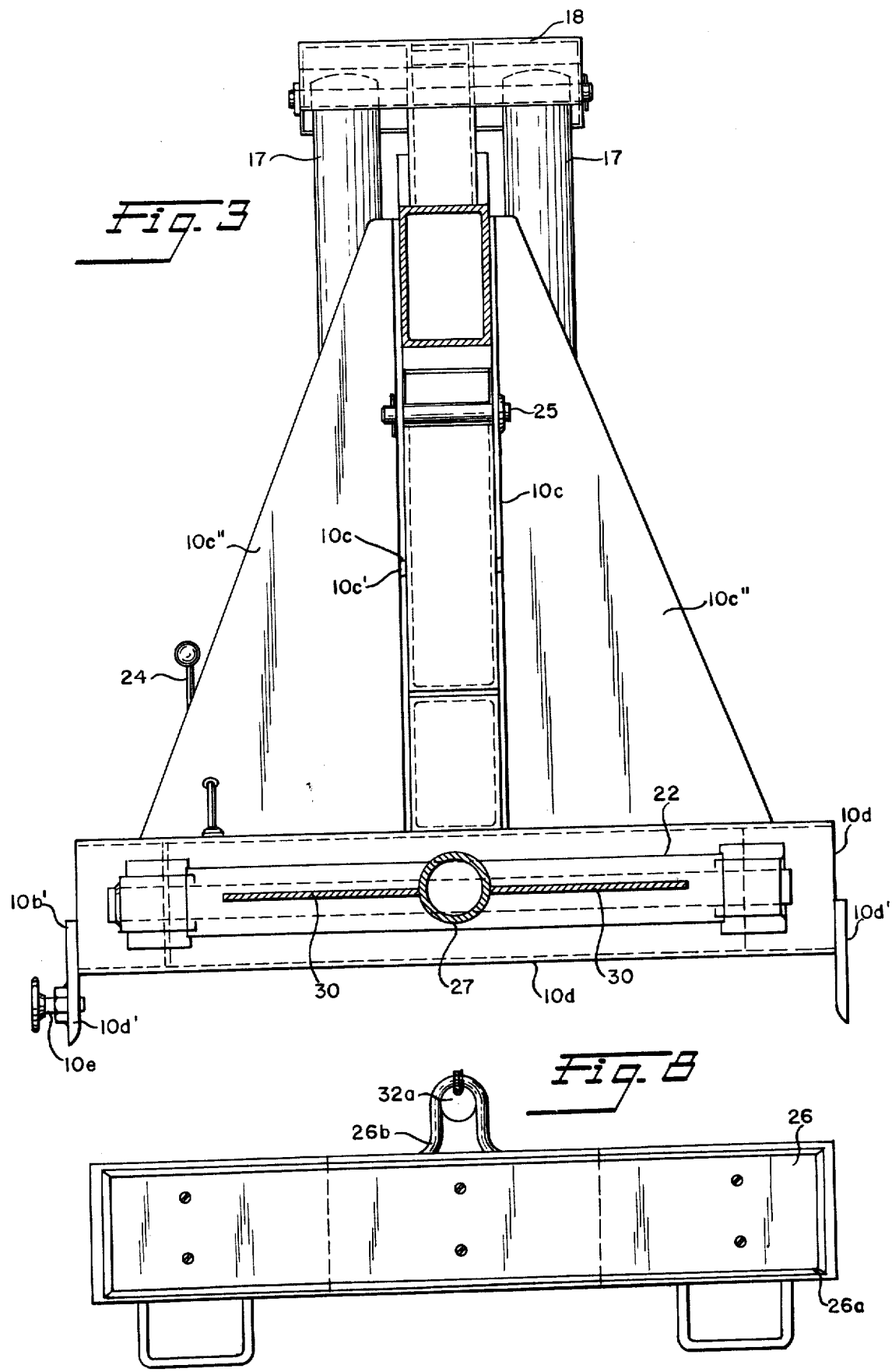

VEHICLE TOW RIG

As a matter of introduction, my invention is concerned with towing apparatus for vehicles, especially a tow rig for heavy-duty tractors, and more particularly with a rig which may be readily mounted on a tractor for retrieving a tractor which has been disabled in use.

One of the objects of my invention is the provision of a tow rig which is comparatively inexpensive in construction, readily adaptable to use, and well suited to easy mounting on a retrieving tractor for ready attachment to a disabled tractor for retrieval of the same.

Another object is the provision of a tow rig with ready adjustability to mounting on retrieving tractors of differing sizes, which rig is quickly and easily adjusted to a disabled tractor, irrespective of the size of the same.

A further object is the provision of a vehicle tow rig which conveniently may be stored at a tractor depot, readily mounted on a retrieving tractor by a single operator, all for instant use in going to the aid of a disabled tractor-trailer.

Other objects of my invention in part will become apparent during the course of the description which follows, and in part more particularly pointed to.

The invention then may be viewed as comprising a novel combination of structural elements, arrangement of parts and interrelation between each of the same with one or more of the others, all as described herein and illustrated in the accompanying drawings, the nature of which invention is more especially set out in the claims at the end of this specification.

BACKGROUND OF THE INVENTION

In the transportation business, the tractor-trailer has come into wide-spread use for hauling heavy loads over long distances and over a variety of terrain. The trailer, of course, carries the load which, in many cases, is of great value. Moreover, the load, in many cases, is perishable. In either case, in the event of a breakdown of the tractor, the disabled tractor must be replaced in order that the load may proceed to its destination. Substantial delay is not acceptable.

Now it is common practice for the trailer to be jacked off of the disabled tractor and a subsequent tractor supplied. The ailing tractor is towed in to a tractor station for repair, and in the process employing a rig of one form or another. Typically, such a rig is shown in the Johnson U.S. Pat. No. 2,481,233, of Sept. 6, 1949. Many of the rigs of the prior art are big, cumbersome, of undue weight, and especially lack an ease of handling, that is, an ease of mounting on a retrieving tractor and adjusting to the particular tractor available. Moreover, many of the prior rigs are lacking in flexibility in use and accommodation to particular size of the vehicle or disabled tractor to be towed in.

One of the particular objects of my invention, therefore, is to provide a simple, efficient, reliable and comparatively inexpensive tow rig for ready mounting on a retrieving tractor and ready adjustment for hitching the rig to a disabled tractor in order to retrieve same. And another is to provide such a rig, reliable and rugged, which quickly and precisely is adjusted by a single operator to engage and lift a disabled tractor for ready towing.

SUMMARY OF THE INVENTION

In the vehicle tow rig of my invention, I provide an A-frame with pivotal mounting of the two legs in substantially vertical plane, with the one leg in substantially horizontal positon. Provision is made by way of a suitable engaging-fitting for securing the lower leg of the rig to the fifth wheel of a tow tractor. The engagement of leg and fitting is such as to permit ready adjustment of the rig to a particular tow tractor. In that regard, apertures are provided along the length of a portion of the lower leg, with corresponding apertures within the engaging fitting, to accommodate one or more pins slipped into the apertures of fitting and leg at appropriate position. The fore end of the lower leg of the A-frame is secured to the fore body of the tractor, while the rear of the leg is secured to a cross member which is readily attached into the rear of the tractor frame.

The upper leg of the A-frame pivotally engages the lower leg at its fore end. And the angle between the two legs is increased or decreased, that is, the upper leg raised or lowered by way of hydraulic means, conveniently a pair of hydraulic rams, the base of which is pivotally secured to the cross member attached to the tractor frame. An oil reservoir connected by way of high pressure tubing to a hydraulic pump, with intermediate control valve for the same, is conveniently positioned adjacent the cross member.

A bumper member for attachment to the bumper of the disabled tractor is supported on a longitudinal tow bar, with intermediate universal joint, pivotally engaging the cross member. For ready adjustment to a particular vehicle to be towed, the tow bar is in the form of telescoping elements with cross pin engaging a desired one of a plurality of apertures within the inner element and a cooperating aperture in the outer element. The tow bar, for a best combination of operating results, is restrained against lateral movement, that is the bar is confined to a swinging up or down motion.

In order to provide the necessary lift for the bumper member, and fore end of the disabled tractor, I provide a cable and pulley combination, with suitable hook engaging into a ring provided on the bumper member, the cable being brought in or let out by way of a hand winch conveniently mounted near the fore end of the A-frame. By this construction, bumper member and bumber may be brought into suitable engagement and secured in position conveniently by way of chains wrapped around the two.

The fore end of the disabled tractor then is readily lifted by operation of the hydraulic rams lifting against the upper leg of the A-frame. And at the desired height, the weight of the upper leg, and the sustained load of the disabled tractor, is supported by a suitable load-carrying pin engaging opposed apertures in the cross-bar, parallel risers, mounted on cross member of the rig.

DESCRIPTION OF THE DRAWINGS

In the accompanying drawings, illustrating a preferred embodiment of my invention:

FIG. 1 presents a vertical view of a vehicle tow rig and the positioning, as shown in dotted lines, with respect to a towing vehicle and the vehicle being towed, certain parts being broken away to better show others.

FIGS. 2 and 3 respectively are vertical front and rear views of the rig as taken along the lines 2—2 and 3—3 of FIG. 1.

FIG. 4 is a vertical sectional view of the lower leg of the A-frame of the rig as taken along the line 4—4 of FIG. 1.

FIG. 5 is a detail underneath view of the flexible connection provided between tow bar and bumper of the rig, as seen along the line 5—5 of FIG. 1.

FIG. 7 is a detail plan view of the hydraulic power system of the rig, as seen along the line 7—7 of FIG. 1, while FIG. 8 is an elevation view of the bumper of the rig, as seen along the line 8—8 of FIG. 1.

Like reference characteristics denote like parts throughout the several views of the drawings.

DESCRIPTION OF THE PREFERRED EMBODIMENT

Figure 6:
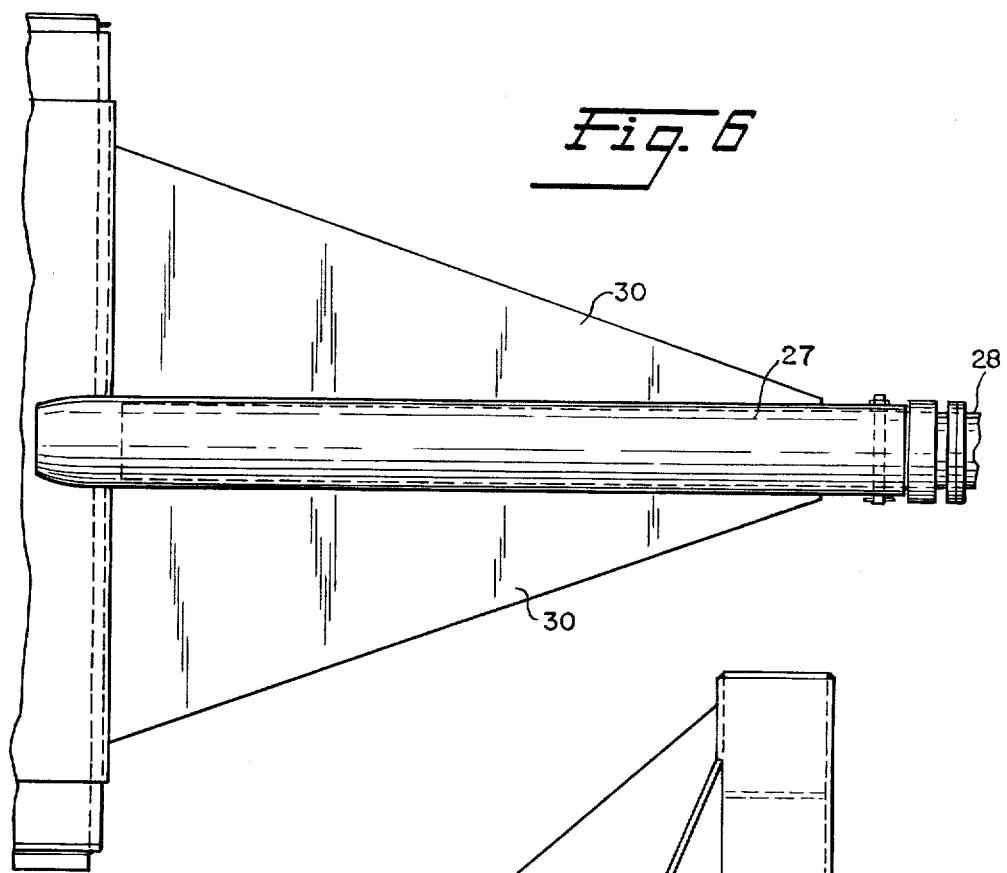
FIG. 6 is a detail plan view of the tow bar of the rig, as seen along the line 6—6 of FIG. 1.

Referring now more particularly to the practice of my invention, and directing attention to FIG. 1 of the drawings, I employ a tractor rig 10, interlinking a towing vehicle or tractor 11, with a vehicle being towed 12. Now the tow rig 10 comprises in combination an A-frame with upper leg 10a, lower leg 10b and cross bar 10c, this in the form of parallel members, one on each side of upper leg 10a. Leg 10b is provided with a series of equally spaced apertures 10b'.

In use of the rig the lower leg 10b is substantially in a horizontal position, actually with a slight backward tilt, as shown in the drawing. Leg 10b convenientally is in the form of a hollow steel beam, as shown in FIG. 4 of the drawings. The leg passes through a hollow sleeve 13 supplied with king pin 14, which latches within the fifth wheel 11a of the tow tractor in use, all as more particularly pointed out hereinafter. Lower leg 10b may be shifted backward or forward to properly adjust the tow rig with respect to the size of the towing tractor and the position of the fifth wheel thereon. Leg 10b is finally fixed at a desired position with respect to sleeve 13 by way of pins 15 engaging spaced apertures 13c of sleeve 13 and corresponding apertures 106' of the lower leg.

Tow rig 10 is further secured to towing tractor 11 by way of spreader chains 16 (see also FIG. 2), engaging in a keyhole slot 10b''' provided in collar 10b'' of the fore end of leg 10b and looped about the lower frame 11b of the towing tractor. As a matter of convenience, a pocket 10b'''' is provided at the extreme fore end of leg 10b to accommodate any excess of chain. The aft end portion of the lower leg 10b of the tow rig is secured to the frame of the towing tractor by way of a suitable cross member of the rig 10d with depending flanges 10d' seating over the frame of the towing vehicle and secured thereto by hand screw 10e, as seen in FIGS. 1, 3 and 7 of the drawings.

Now the upper leg 10a of the tow rig is pivotally connected with leg 10b by way of pin 17 engaging in apertures provided in the fore end of leg 10a and corresponding apertures provided in collar 10b'' of leg 10b.

Figure 7:
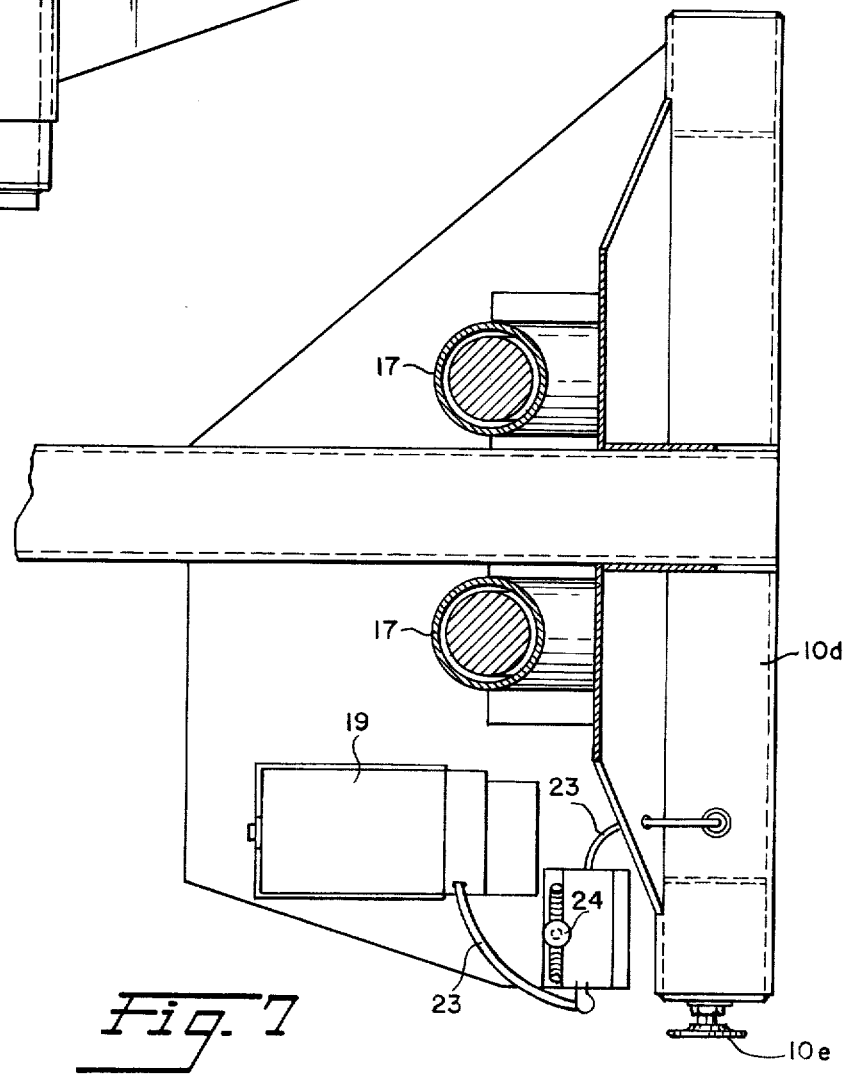

Provision is made for increasing the angle between legs 10a and 10b by way of two parallel hydraulic rams 17, one on each side of the upper leg (see also FIGS. 3 and 7). The rams are pivotally supported in brackets 10f fixedly secured to cross member 10d. The upper end of rams 17 engage in a cap 18 secured to leg 10a by way of gussets 18a conveniently welded thereto. Hydraulic power is supplied the rams by pump 19 electrically connected to the battery system of the towing tractor through connection 20 and interconnecting conduit 21. Conveniently the pump is mounted to bracket 21 at the rear of leg 10b. Pump 19 connecting with oil reservoir 22 (see FIG. 3) by way of appropriate tubing 23 serves to supply the power for the hydraulic rams. The raising and lowering of the rams and consequently the upper leg 10a of the A-frame is had by the stick-operated, three-way valve 24. Conveniently, the oil reservoir 22 is built into the cross member 10d of the rig, as shown in FIG. 3 of the drawings.

Upon lifting upper leg 10a and the vehicle to be towed, as more fully described hereinafter, the load on rams 17 is relieved and thereafter sustained by the cross bar 10c and supporting load carrying pin 25 seating in corresponding apertures 10c' of the parallel members of the cross bar of the A-frame.

The tow rig of my invention, appropriately mounted on a towing or retrieving tractor, that is, on the fifth wheel of the tractor, and secured fore and aft to the frame of the tractor, as more fully described above, is brought into proper position conveniently in front of a disabled tractor to be towed in for repair. A cross bumper member 26 conveniently with rubber facing 26a (see also FIG. 8) is positioned at the end of a combination telescoping tow bar 27 and universal joint 28 (see also FIGS. 5 and 6). Tow bar 27 is pivotally mounted at one end for up and down swing on a horizontal shaft 29 secured to cross member 10d as by welding. The bar is restrained from lateral motion by way of gussets 30 (see also FIGS. 3 and 6) conveniently welded to bar and housing for shaft 29. The opposite end of the tow bar is secured to one end of universal joint 28 as by collar 31. The other end of the universal joint is secured to the back of 26b of the horizontal bumper plate.

In bringing the towing tractor with tow rig 10 into position for attachment and tow of the disabled vehicle 12, I drop bumper 26 into position for engagement with bumper 12a of the disabled vehicle, this by means of cable and pulley combination 32 with hasp 32a engaging a U-shaped fitting 26b, conveniently welded to the bumper member (see also FIG. 8). One end of cable 32 is secured to the end of upper arm 10a, as at 10a' and the other, after passing around pulleys 32b and 32c is brought to hand winch 33 conveniently mounted near the fore end of upper arm 10a, as best seen in FIG. 1. Bumper member 26 is raised or lowered as desired by control of hand winch 33 to bring the same into proper positioning and contact with bumper 12a of the disabled vehicle. The two then conveniently are held together by way of chains 34 wrapped around engaging ends of the two bumpers, and telescoping tow bar 27 is brought to desired length and secured there by pin 35 by engaging cooperating apertures 27a in inner and outer sleeves 27a and 27b. It is then that the hydraulic rams are brought into action to lift the front end of the disabled vehicle well above the ground for proper towing. And once lifted pin 25 is thrust into position and the hydraulic rams relaxed, the load then being borne by the load-carrying pin for towing.

As a safety measure, there is provided a chain 36 connecting with bumper 26 as at 26c by way of suitable hasp 35a, the upper portion of the chain being linked into a suitable fitting 10a''.

In bringing in the disabled vehicle, stability is provided by way of the tow bar and universal joint under the varying road conditions encountered. Side sway of the towed vehicle is effectively prevented by the restrained up and down motion permitted by the tow bar.

Upon reaching the trucking depot, the upper leg of the A-frame is raised by the hydraulic rams to relieve the load-supporting pin, the pin withdrawn, and the rams then activated to lower the disabled tractor to the ground. The upper leg of the rig is then brought to rest, the cable-pulley combination released, the chains securing the bumpers of tow rig and disabled tractor also released, and so too the spreader chains and hand screw member securing the rig to the frame of the tractor. The disabled tractor is then in position for repair, the tow rig for storage for the next effort, and the retrieving tractor available for other use.

Thus it will be seen that I provide in my invention a tow rig in which the various objects hereinbefore set forth are effectively achieved. My tow rig, comparatively inexpensive in construction, and fashioned from available parts, is conveniently stored in a trucking depot for quick use and easy handling by a single operator. The tow rig is lifted from its storage rack by a crane commonly available and mounted on the fifth wheel and frame of a waiting towing tractor. With the towing tractor brought into position and the disabled tractor released by jacking up the waiting trailer, the rig is quickly and easily secured to the disabled tractor for retrieval and repair.

Since many embodiments may be made of my invention, and since many changes may be made in the embodiment described above, it is to be understood that all matter described herein, or shown in the accompanying drawings, is to be taken as illustrative and not by way of limitation.

I claim:

1. Vehicle tow rig comprising in combination an A-frame for mounting in a substantially vertical plane with the lower leg in a substantially horizontal position and the two legs thereof pivotally connected at the apex; means for connecting said lower leg with the fifth wheel of a retrieving tractor; means for securing the apex of said A-frame to said tractor; means for securing the rear of the A-frame to the rear of said tractor; means secured to the upper leg of said A-frame and to a bumper member for correspondingly raising and lowering said bumper member relative to said upper leg for attachment to a vehicle to be towed; power means for increasing and decreasing the angle between said upper and lower legs of the A-frame and correspondingly raising and lowering said upper leg for raising and lowering said bumper means and vehicle; and tow for means secured to said A-frame and connecting with said bumper member.

2. Vehicle tow rig, according to claim 1, wherein said means for connecting the said lower leg with the fifth wheel of said retrieving tractor comprises means adjustably accepting said lower leg, and wherein a plurality of spaced apertures are provided in said lower leg and apertures are provided in said leg-accepting means for cooperation with one or more of the apertures of the lower leg, and there is provided pin means passing into said cooperating apertures for securing said lower leg with respect to said fifth wheel.

3. Vehicle tow rig according to claim 1, wherein said means secured to the upper leg of said A-frame for raising and lowering a bumper member comprises cable and pulley means operable by a hand winch mounted on said A-frame.

4. Vehicle tow rig according to claim 1, wherein said power means for increasing and decreasing the angle between said upper and lower legs of the A-frame comprises a pair of hydraulic ram means spaced on opposite sides of said A-frame.

5. Vehicle tow rig according to claim 1, wherein said power means includes hydraulic ram means, electrically-operated hydraulic pump means therefor, and electrical outlet to said pump means for connection with the electrical system of said retrieving tractor.

6. Vehicle tow rig according to claim 1, wherein there are provided parallel riser members, spaced on opposite sides of said A-frame, and secured to said means for securing the rear of the A-frame to the rear of said tractor, which parallel members are provided with a plurality of spaced apertures for accepting a pin within cooperating apertures for sustaining the load of said upper leg when released by said power means.

7. Vehicle tow rig according to claim 1, wherein said tow bar means secured to said A-frame and connecting with said bumper member comprises a telescoping bar means and universal joint.

8. Vehicle tow rig according to claim 1, wherein a pair of spreader chain means are provided for securing said apex of said A-frame to the fore part of said tractor.

9. Vehicle tow rig according to claim 1, wherein said power means comprises hydraulic pump means and reservoir therefor, said reservoir being positioned within said means for securing the rear of the A-frame to the rear of said tractor.

* * * * *